United States Patent [19]

Miller

[11] 4,254,370
[45] Mar. 3, 1981

[54] CLOSED LOOP POSITIONER FOR A STEPPING MOTOR DRIVEN BY A BUFFERED TRANSLATOR

[75] Inventor: Peter S. Miller, Waterville, Ohio
[73] Assignee: Owens-Illinois, Inc., Toledo, Ohio
[21] Appl. No.: 929,639
[22] Filed: Jul. 31, 1978
[51] Int. Cl.³ ............................................. G05B 19/40
[52] U.S. Cl. .................................. 318/685; 318/696
[58] Field of Search ............................ 318/696, 685

[56] References Cited
U.S. PATENT DOCUMENTS

| 3,475,667 | 10/1969 | Newell | 318/696 |
|---|---|---|---|
| 4,034,277 | 7/1977 | Leenhouts | 318/685 |
| 4,072,888 | 2/1978 | Bechtle et al. | 318/685 |
| 4,075,544 | 2/1978 | Leenhouts | 318/696 |

Primary Examiner—B. Dobeck
Attorney, Agent, or Firm—David R. Birchall; Myron E. Click; David H. Wilson

[57] ABSTRACT

Disclosed is an apparatus and method for controlling the position of a stepping motor which is driven by a buffered translator. Commands calling for either forward or reverse motor steps are sent to the buffered translator, and the motor subsequently executes these commands. In order to determine if the motor executes all of the commands sent to the buffered translator, a signal representing the position the motor would assume if all of the commands were executed is compared to a signal representing the actual position of the motor. If they do not correspond, additional command pulses are caused to be generated to the buffered translator until the desired motor position is achieved.

7 Claims, 1 Drawing Figure

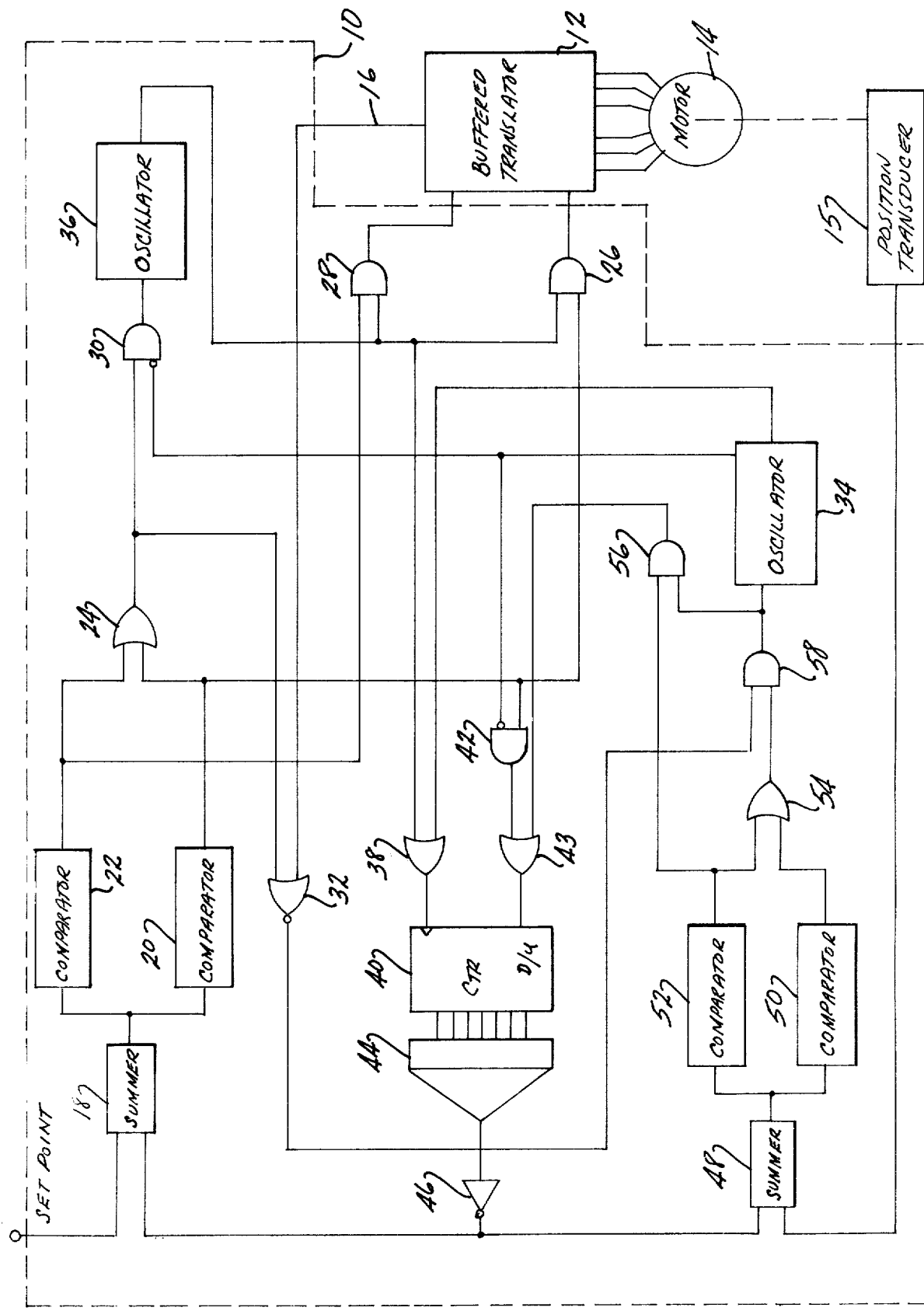

CLOSED LOOP POSITIONER FOR A STEPPING MOTOR DRIVEN BY A BUFFERED TRANSLATOR

BACKGROUND OF THE INVENTION

This invention relates to stepping motors. More particularly, this invention relates to stepping motors which are driven by a buffered translators. Buffered translators are well known in the art, and are utilized to accelerate and decelerate stepping motors at the maximum possible rate while maintaining accurate operation. Buffered translators receive command pulses calling for either forward or reverse motor steps. These command pulses may be received at a rate which is much greater than the acceleration capabilities of the motor. The buffered translator causes the motor to execute the commands at an acceleration which is within the motor's capability. Generally, buffered translators are operated open loop, and it is assumed that the motor will unerringly follow its commanded steps. There may be certain instances, however, such as power interruption, where all of the command pulses may not be executed. It may therefore be desirable to operate the motor in a closed loop configuration. Due to the delay introduced in the execution of command pulses by the buffered translator, a comparison of a position set point (i.e. desired motor position) with actual motor position is of no use until the buffered translator has executed all previously entered commands and the motor has stopped. Use of direct feedback would thus slow down the control process and largely negate the speed advantages of the buffered translator.

SUMMARY OF THE INVENTION

Accordingly, the present invention discloses a method and apparatus for the closed loop operation of a stepping motor which is driven by a buffered translator. Initially, a sufficient number of command pulses to obtain a desired change in motor position are sent to the buffered translator. During this period the circuit operates open loop with respect to the motor, i.e. it is assumed that all of the command pulses sent to the buffered translator will be executed by the motor. A signal which represents the position the motor would ultimately assume if all of the command pulses were executed is used as a feedback to control the generation of command pulses. This signal is referred to as the internal position signal and is a function of the number of command pulses which are sent to the buffered translator. The internal position signal corresponds to the desired position of the motor when all of the required command pulses have been generated. After the motor has stopped (i.e. after enough command pulses have been generated to achieve the desired position change and no command pulses remain in the buffered translator), a signal representing the actual position of the motor is compared to the internal position signal in order to determine if the motor executed all of the command pulses which were sent to the buffered translator. If there is an error between the two signals, the value of the internal position signal is changed slightly. This creates an error between the internal position signal and the desired position thus causing the generation of additional command pulses to the buffered translator. This control sequence continues until the desired position and actual position correspond to each other.

BRIEF DESCRIPTION OF THE DRAWING

The single drawing FIGURE is a schematic diagram of the control circuit of the present invention.

DETAILED DESCRIPTION OF THE DRAWING

Referring to the drawing, a positioner circuit 10 generates forward and reverse pulses to a buffered translator 12, which in turn drives a stepping motor 14. The circuit 10 may generate pulses at a rate which is much higher than the acceleration or deceleration capabilities of the motor 14. The buffered translator 12 stores the pulses from the circuit 10 and causes them to be executed at a rate which is within the operating limits of the motor 14. Position changes are thus achieved as quickly as possible while retaining accurate motor operation. A conventional position transducer 15 generates a signal for transmission to the circuit 10 which is a function of the position of the shaft of the motor 14. A busy signal having a logic "1" is generated by the buffered translator 12 and sent to the circuit 10 along a line 16 whenever the buffered translator 12 retains any unexecuted step commands, i.e. whenever the motor 14 is still running.

Initially, the motor 14 is at rest and the position of the motor shaft (as measured by the position transducer 15) is equal to a signal which represents the position set point (i.e. the desired position of the motor shaft). A signal representing the internal position of the circuit 10 (i.e. the position where the circuit 10 determines that the motor shaft should be) is initially equal in magnitude and opposite in sign from the set point and motor position signals. When it is desired to change the motor position, the value of the set point signal is changed to represent the desired location of the motor shaft. The set point signal and the internal position signal are summed by an op-amp summer 18 in order to determine the error of the internal position with respect to the set point. The change in the set point causes a non-zero value to appear at the output of the summer 18. This value is compared to positive and negative limits by a pair of comparators 20 and 22. If the limits are not exceeded, the error between the set point and internal position is negligible, and a logic "0" appears at the output of the comparators 20 and 22. If the error is great enough, a "1" will be generated by one of the comparators 20 and 22, depending upon whether the new set point is ahead of or behind the internal position. This causes the output of an OR gate 24, whose inputs are fed by the outputs of the comparators 20 and 22, to go to "1". In addition to being connected to the OR gate 24 the output of each of the comparators 20 and 22 is connected to an input of an AND gate 26 and 28 respectively.

The output of the OR gate 24 is connected to an input of an AND gate 30 and to an input of a NOR gate 32. An output of an oscillator 34 is connected to an inverted input of the AND gate 30, and the output of the AND gate 30 is connected to an oscillator 36. Initially, the oscillator 34 is not running and a "0" is generated to the AND gate 30. Thus, when the output of the OR gate 24 goes to "1" (i.e. when an error is detected between the set point and internal position), the output of the AND gate 30 goes to "1". This in turn starts the oscillator 36. The output of the oscillator 36 has a fixed frequency and is connected to inputs of the AND gates 26 and 28 and to an input of an OR gate 38. Thus, when the oscillator 36 starts, one of the AND gates 26 or 28 passes the oscillator frequency to its output, depending upon which comparator 20 or 22 has a "1" at its output (i.e. whether the internal position is behind or ahead of the set point). The outputs of the AND gates 26 and 28 are connected to the buffered translator 12. If the oscillator frequency is passed by the AND gate 26, the internal position is ahead of the set point, and the buffered translator 12 causes the motor 14 to move in a reverse direction a number of steps equal to the number of pulses received from the AND gate 26. If the oscillator frequency is passed by the AND gate 28, the buffered translator 12 causes the motor 14 to move forward rather than reverse.

During the time that pulses from the oscillator 36 are being delivered to the buffered translator 12, an up/-down counter 40 is keeping a count of the number of pulses sent to the buffered translator 12. One output of the oscillator 34 is connected to an input of the OR gate 38, and its value is initially "0". Therefore, the pulses generated by the oscillator 36 are passed by the OR gate 38, whose output is connected to the clock input of the counter 40. The counter 40 thus counts every pulse which is sent to the buffered translator 12. The output of the comparator 20 is connected to an inverted input of an AND gate 42, the output of which is connected to an input of an OR gate 43.

The other input to the AND gate 42 is initially "1", while the other input of the OR gate 43 is initially "0". The direction of counting of the counter 40 is thus determined by whether the output of the comparator 20 is "1" or "0". If the output of the comparator 20 is "1", reverse pulses are sent to the buffered translator 12 and the outputs of the AND gate 42 and OR gate 43 are "1", which causes the counter 40 to count down. If the output of the comparator 20 is "0", forward pulses are sent to the buffered translator and the counter 40 counts up.

The state of the counter 40 represents the internal position of the circuit 10. The digital representation is converted to an analog voltage by a digital-to-analog converter 44, the output of which is inverted by an inverter 46. It is the output of the inverter 46 which is connected to the summer 18. The counter 40 continues counting until the internal position has changed enough to agree with the set point. At this point, the output of the summer 18 is negligible and the outputs of both comparators 20 and 22 are thus "0". This causes the OR gate 24 to go from "1" to "0" which in turn causes the output of the AND gate 30 to go from "1" to "0", thus stopping the oscillator 36. The counter 40 stops counting when the oscillator 36 stops. The buffered translator 12, however, continues to execute any remaining steps. As long as the buffered translator 12 is busy, a "1" is generated on the line 16. The line 16 is connected to the other input of the NOR gate 32. The output of the NOR gate 32 is "0" whenever the buffered translator 12 is busy or when the output of the OR gate 24 is "1" (i.e. there is an error between the set point and the internal position).

The position of the motor 14 is continuously monitored by the position transducer 15. The output of the position transducer 15 is connected to an input of an op-amp summer 48, as is the internal position output of the inverter 46. The output of the summer 48 is connected to the inputs of two comparators 50 and 42. The summer 48 and the comparators 50 and 52 are utilized in a fashion identical to the summer 18 and comparators 20 and 22, and are employed to detect an error between the internal position and the motor position. The outputs of the comparators 50 and 52 are connected to the inputs of an OR gate 54, whose output thus goes to "1" if the output of either comparator 50 or 52 is "1" (i.e. if the error between the internal position and motor position exceeds the limits of one of the comparators 50 and 52). In addition, the output of the comparator 52 is connected to an input of an AND gate 56. The output of the OR gate 54 is connected to one input of an AND gate 58, while the output of the NOR gate 32 is connected to the other input of the AND gate 58. The output of the AND gate 58 is connected to an input of the AND gate 56 and to the input of oscillator 34.

Since the motor 14 does not move as quickly as pulses are received by the buffered translator 12 (and counted by the counter 40) an error will develop between the internal position and the motor position. This will cause the output of the OR gate 54 to go to "1". The output of the AND gate 58 will remain at "0", however, as long as the output of the NOR gate 32 is "0". Once there is no error between the set point and the internal position (i.e. the output of the OR gate 24 is "0"), and the buffered translator 12 is no longer busy, the output of the NOR gate 32 will go to "1", thus enabling the AND gate 58. If at this time there is still an error between the internal position and the motor position, the output of the AND gate 58 will go to "1" and the oscillator 34 will start. In addition the AND gate 56 will be enabled. The output of the oscillator 34 which is connected to an inverted input of the AND gates 30 and 42 has a relatively medium pulse width, and serves to prevent the oscillator 36 from being triggered while the oscillator 34 is running. The other output of the oscillator 34 has a relatively short pulse width and is connected to an input of the OR gate 38. The oscillator pulses are passed through the OR gate 38, thus causing the counter 40 to count. If the output of the comparator 52 is "1", the output of the AND gate 56, which is connected to an input of the OR gate 43, will also be "1". This will cause the output of the OR gate 43 to be "1", thus causing the counter 40 to count down. If the output of the comparator 52 is "0", the counter 40 will count up. During the medium pulse width of the oscillator 34, the output of the AND gate 42 will be "0", thus preventing the output of the comparator 20 from affecting the direction of counting. The oscillator 34 continues to cause the counter 40 to count until one of the comparators 20 or 22 recognizes an error between the set point signal and the internal position signal, at which point the oscillator 34 stops. This enables the AND gates 30 and 42 and allows the sequence for equalizing the set point and internal position to be repeated.

From the foregoing description, the operation of the circuit of FIG. 1 may be described as follows. Initially the motor 14 is at rest and the motor shaft position (as measured by the position transducer 15) is equal to the position set point and the internal position. When a new position is desired, the set point is changed. This causes an error to exist between the set point and the internal position. The oscillator 36 generates pulses which are sent to the buffered translator 12 calling for either forward or reverse motion of the motor 14. The oscillator pulses are counted by the counter 40, and the oscillator 36 continues to run until the set point and internal position agree again. At this point the oscillator 36 stops but the buffered translator 12 continues to execute any remaining pulses. Since the motor 14 lags behind the counter 40, an error between the internal position and the motor position will develop. Such an error generally causes the oscillator 34 to start running. An interlock, however, prevents the oscillator 34 from running as long as either the oscillator 36 is running or the buffered translator 12 is busy. When the motor 14 stops and the busy signal disappears, the motor position should agree with the internal position. If not, the oscillator 34 will cause the counter 40 to count once or twice, thus causing an error to develop between the internal position and the set point. As soon as the current medium width pulse from the oscillator 34 goes to "0", the error between the internal position and the set point starts oscillator 36 again and the sequence is repeated. Normally, the motor position and internal position will agree at the end of a move. But if they don't, as might happen in a power interruption or because of RF interference altering the state of the counter 40, repetition of the described sequence will bring the motor position to agree with the position set point.

What is claimed is:

1. A closed loop servo system for adjusting the position of a stepping motor, wherein a buffered translator receives command pulses calling for either forward or reverse motor steps and causes the motor to execute the command pulses, comprising:
   set point signal generating means for generating a signal representing the desired position of said motor;
   position transducer means for generating a signal representing the actual position of said motor;
   control means for generating command pulses in response to a change in said set point signal for transmission to said buffered translator;
   first feedback means for insuring that a sufficient number of command pulses are generated to achieve the desired change in motor position;
   second feedback means, connected to said position transducer means, for determining whether or not said motor executes every command pulse received by said buffered translator;
   correction means for causing said control means to generate additional command pulses to said buffered translator in order to compensate for any positioning error resulting from the failure of said motor to execute each command pulse which is received by said buffered translator, thereby ultimately causing said position signal to agree with said set point signal.

2. The system of claim 1 wherein said control means includes an oscillator which generates said command pulses and logic means connected to said oscillator which control the direction of motion of said motor.

3. The system of claim 1 wherein said first feedback means includes a counter for counting the number of command pulses which are sent to said buffered translator, means for generating an internal position signal as a function of the number in said counter, means for comparing said internal position signal with said set point signal, and means for generating an error signal whenever the difference between said internal position signal and said set point signal exceeds predetermined limits.

4. The system of claim 3 wherein said second feedback means includes means for comparing said internal position signal with said position signal when said internal position signal is generally equal to said set point signal and said buffered translator contains no unexecuted command pulses, and wherein said correction means includes means for changing the value of the number in said counter until said comparing means determines that said internal position signal is generally equal to said position transducer signal.

5. A method for adjusting the position of a stepping motor, wherein a buffered translator receives command pulses calling for either forward or reverse steps and causes the motor to execute the command pulses, comprising the steps of:
   generating a number of command pulses for transmission to said buffered translator sufficient to cause the desired amount of motion of said motor;
   generating a set point signal representing the desired position of said motor;
   generating an internal position signal representing the position said motor would assume if it executed all of the command pulses which are sent to said buffered translator;
   comparing said set point signal with said internal position signal in order to determine when the desired number of command pulses have been generated;
   determining whether or not said motor executes every command pulse which is sent to said buffered translator; and
   generating additional command pulses to compensate for the failure of said motor to execute every command pulse.

6. The method of claim 5 wherein the step of determining whether or not said motor executes every command pulse includes the steps of generating an actual position signal representing the actual position of said motor and comparing, when said buffered translator contains no remaining unexecuted command pulses and said set point signal is generally equal to said internal position signal, said internal position signal with said actual position signal.

7. The method of claim 6 wherein the step of generating additional command pulses includes the steps of: (a) changing the value of said internal position signal independently of said command pulses until it is generally equal to said actual position signal; (b) subsequently generating additional command pulses until said internal position signal is again generally equal to said set point signal, and; (c) repeating steps a and b until said actual position signal generally equals said set point signal.

* * * * *